United States Patent [19]

Klefbeck

[11] Patent Number: 4,656,773
[45] Date of Patent: Apr. 14, 1987

[54] ENERGY EFFICIENT CASTING ROD

[76] Inventor: Robert J. Klefbeck, 3 Dresden Ct., Albany, N.Y. 12203

[21] Appl. No.: 869,601

[22] Filed: Jun. 2, 1986

[51] Int. Cl.⁴ .............................................. A01K 91/02
[52] U.S. Cl. .......................................... 43/18.1; 43/19
[58] Field of Search ....................... 43/18.1, 19, 25, 45

[56] References Cited

U.S. PATENT DOCUMENTS

| | | | |
|---|---|---|---|
| 1,962,232 | 6/1934 | Clairon | 43/18.1 |
| 2,593,885 | 4/1952 | James | 43/19 |
| 3,863,381 | 2/1975 | Ladany | 43/25 |
| 4,216,602 | 8/1980 | Daniels | 43/18.1 |
| 4,283,875 | 8/1981 | Daniels | 43/18.1 |
| 4,439,944 | 4/1984 | Johnson | 43/19 |
| 4,547,991 | 10/1985 | Searcy | 43/18.1 |

Primary Examiner—M. Jordan
Attorney, Agent, or Firm—Heslin & Rothenberg

[57] ABSTRACT

A device relating to a breakdown sport fishing rod, to better utilize the energy applied to casting a weight. The device having a fishing rod butt section supporting an adjustable rotating spool at its tip end. The spool has an attached cylindrical appendage capable of receiving interchangeable rod blanks. The appendage also adapted to support and provide adjustments for a pulley. The pulley communicating by means of elastomers and or cables with one or a pair of pulleys placed in a second adjustable environment on an additional appendage. This appendage is one of a flexible variety and supported by said rod butt section. The present invention induces an exaggeration of rod action, resulting in an increase in the rods recoil power and velocity, providing a longer cast of common fishing projectiles.

7 Claims, 3 Drawing Figures

ENERGY EFFICIENT CASTING ROD

BACKGROUND ART

Many improvements have been applied to this fishing rod art. After reviewing patents residing in this field, it has become apparent the present invention has solved many problems for the common fisherman. The principles that surround the prior arts are as follows: "The basic fishing rod balances mass, inertia and spring when casting. In theory the prime function of the common fishing rod is to bend or flex, and the ability to send a weight through the air is called recoil power. Recoil power has been defined as stiffness or moment of inertia, this united with proper weight distribution is referred to as the theory of rod function, having velocity the end product of casting. Velocity which you achieve through muscular impulse (acceleration) multiplied by the time of the cast. The action of the rod to a large extent determines the time factor (fast or slow). The action is controlled by the rods taper, thus the ideal rod is one that is harmonically sound and whose effective bending length is longest for the weight being propelled. This does not mean that long rods are better than short ones or light rods are better than heavy ones. It does mean that the slowest rod to reach any hypothetical maximum of recoil power is close to if not perfection". The present invention exaggerates common fishing rod dynamics by combining with simple mechanics. The present invention uses a short well balanced rod less its handle, this is then placed in a ferrule tipped cylindrical housing or appendage. The appendage having a means to mount and adjust a pulley. The pulley is to support an elastomer and/or cable and communicate with adjustable pulley or pulleys of a second appendage. This appendage being of a flexible variety. The first said cylindrical appendage is mounted on a rotating spool. The spool is provided with a means to set and adjust the limits of its clockwise rotation. The spool is placed on a fishing rod butt section by means of its axle, said rod butt section also supports the flexible appendage. Upon the muscular impulse of a crisp backcast, the spool rotates in a clockwise direction resulting in a pivoting motion of attached cylindrical appendage and rod blank; as the pulley supported elastomer and/or cable system is storing its energy, the spool's clockwise rotation is abruptly stopped and reversed by said means of adjusting and limiting the spool's clockwise rotation. This abrupt stopping and reversing action combined with the releasing of energies contained in the pulley systems, along with a means to abruptly arrest the spool's counter-clockwise rotation has induced an exaggeration in the bending length of the rod blank, resulting in an increase in the rods recoil power and velocity. The present invention is capable of a substantially longer cast than its conventional counterparts residing in the prior arts. The device, through use of its adjustments and options is capable of accommodating all fishing projectiles regardless of their varing weights.

SUMMARY OF THE INVENTION

It is a major objective of the present invention to provide the fisherman with a fishing rod which is capable of a substantial increase in the distance one may cast a common fishing projectile. This is important so as he may reach out to more aquatic feeding areas by covering a larger volume of water. A second major objective is to provide an option of two new energy storing modes, to be a part of and effectively unite the mechanics of the present invention with common fishing rod dynamics. It is a third and equally important objective to provide a totally adjustable rod, capable of various power altering arrangements to accommodate the varying weights of common fishing projectiles. Generally, the objectives of this invention are carried out by a fishing rod butt section, attached near its tip is a flexible appendage, said appendage extending outward from, and then parallel to a projected line of the rod butt section. This appendage is provided with a plurality of mounting holes to receive a means to attach and adjust a pulley or pulleys. Located at the extreme tip of the rod butt section is a hole provided to accommodate a pin. The pin serves as an axle for two rotating discs or spool. The spool is provided with a centered hole to accommodate said axle, and a plurality of holes allowing an option of pin placements to adjust and set the limits of the spool's clockwise rotation. The spool also has an insular hole to receive a pin to limit its counter-clockwise rotation. The spool includes a means to attach a cylindrical appendage. The cylindrical appendage has a narrow slot running through its top to bottom diameter to receive a pulley. By a means for attachment, said pulley is mounted through one of a number of openings placed along and through the side diameter of said cylindrical appendage. This provides options to the pulleys location along the appendage. The adjustable pulley of the cylindrical appendage is to communicate with the adjustable pulley or pulleys of the flexible appendage by means of an elastomer and/or cable, thereby providing an option of two energy storing modes. The cylindrical appendage has an opening at its tip, said opening serves as a sleeve type ferrule to accept interchangeable fast, medium or slow fishing rod blanks. Upon the muscular impulse of a crisp backcast, the spool rotates in a clockwise direction resulting in a pivoting motion of attached cylindrical appendage and rod blank; as the pulley supported elastomer and/or cable system is storing its energy, the spool's clockwise rotation is abruptly stopped and reversed by said means of adjusting and limiting the spool's clockwise rotation. This abrupt stopping and reversing action combined with the releasing of energies contained in the pulley systems, along with a means to abruptly arrest the spool's counter-clockwise rotation has induced an exaggeration in the effective bending length of the rod blank while adding time to the cast. This results in an increase in the rods recoil power and velocity. The present invention is capable of a substantially longer cast than its conventional counterparts residing in the prior arts. The device, through use of its adjustments and options is capable of accommodating all fishing projectiles regardless of their varing weights. These and other objects, features and advantages of the present invention will become more apparent in the following description of a preferred embodiment with reference to the accompanying drawings, in which

BACKGROUND OF THE INVENTION

Figure 1:
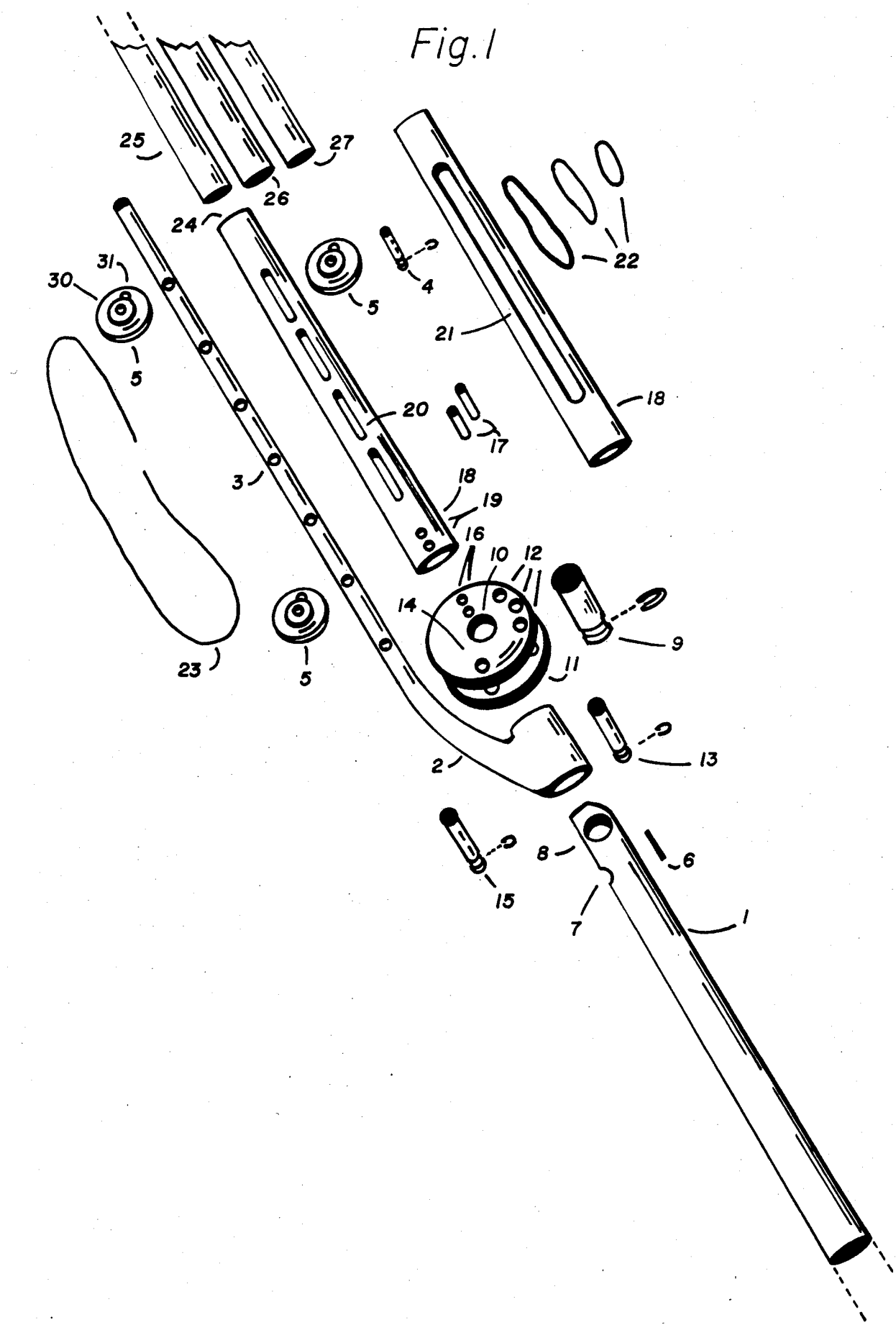
FIG. 1 is a side view of the major components comprising the invention. The device is in a disassembled state, with enlargements therein.
Figure 2:
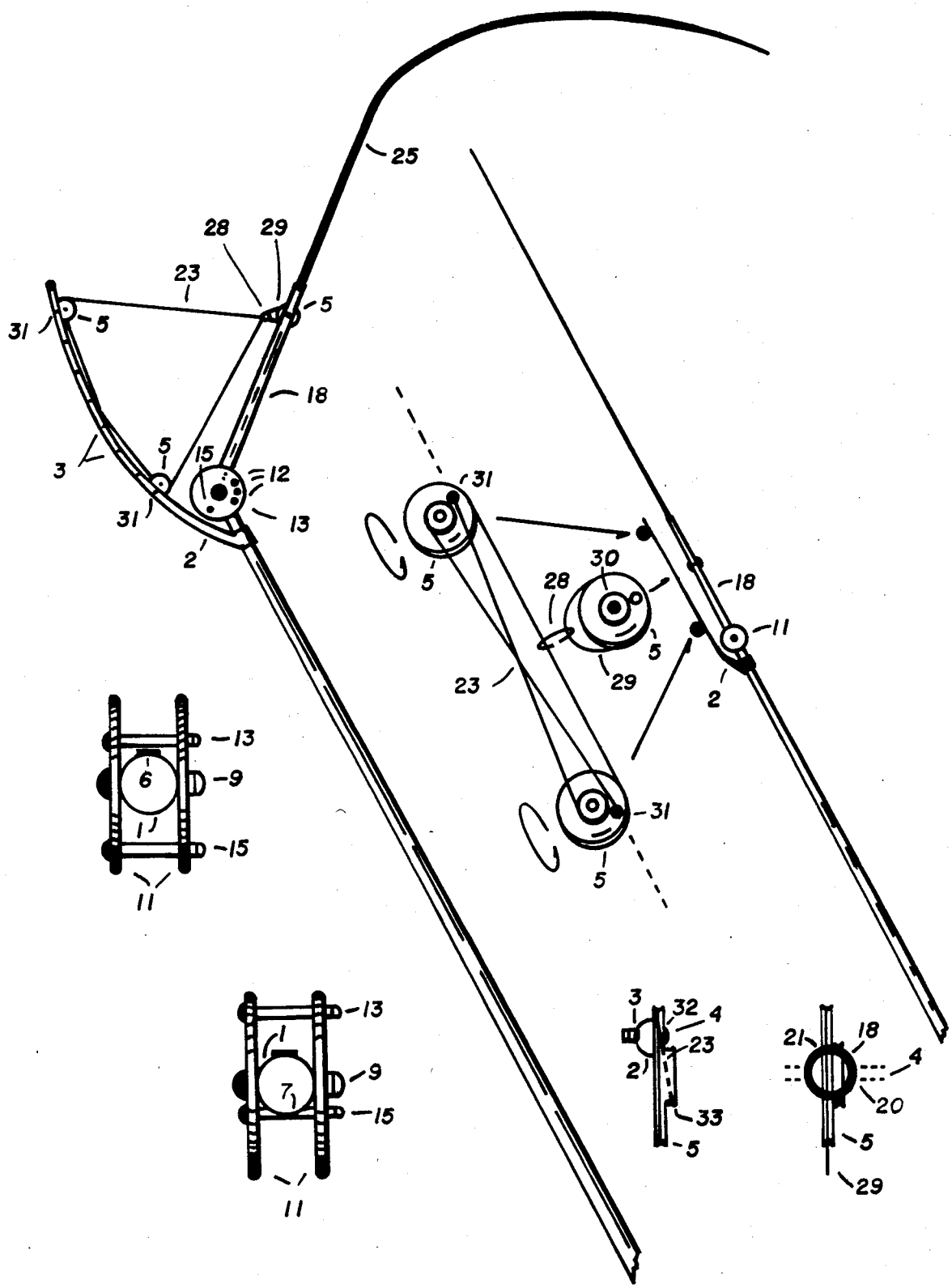
FIG. 2 is a plan view of the invention, including enlargements of components used in the cable or mode A system. The rod is shown in a relaxed and stressed state.
Figure 3:
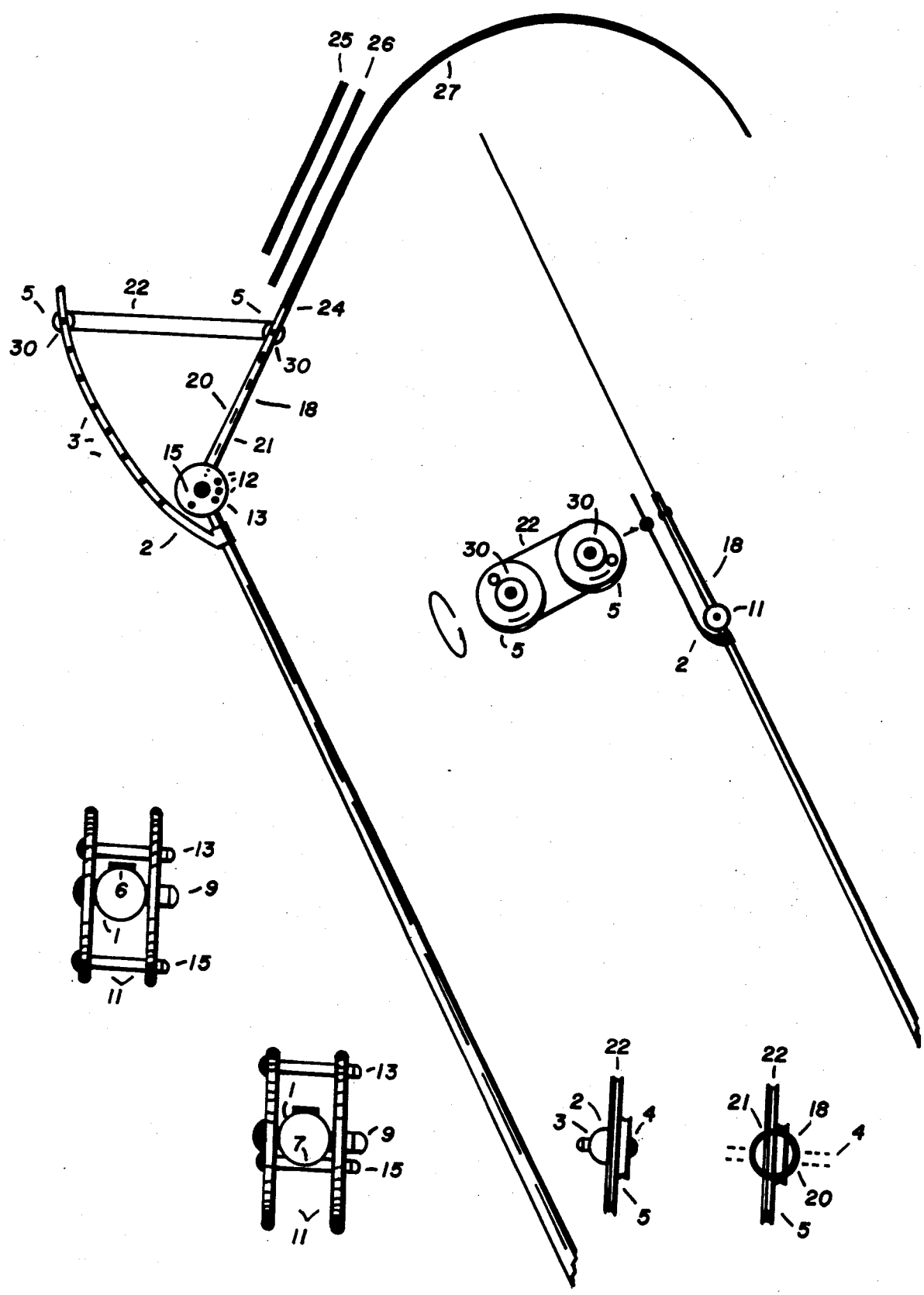
FIG. 3 is a plan view of the invention, illustrating enlargements of components used in the elastomer or mode B option. The rod is shown in a relaxed and stressed state.

The present invention relates to an adjustable breakdown fishing rod, capable of a more efficient use of the energy applied to the act of casting common fishing projectiles, resulting in an increase in the distance these projectiles can obtain. The device unites common fishing rod dynamics with mechanical advantages of the present invention.

TECHNICAL FIELD

The technical field in which the present invention resides is believed to be of group art 325 and references to be cited may be found in class 43 and subclass 18.

DETAILED DESCRIPTION OF THE PREFERRED EMBODIMENT

In reference to FIG. (1) in this a side view of the components, a fishing rod butt section denoted by numeral 1 having an end tapered and sized to receive the sleeve portion of a flexible appendage 2. The sleeve portion of the flexible appendage 2, firmly slides over and beyond the tip portion of the fishing rod butt section 1. Flexible appendage 2 having holes 3 and mounting pins 4 to place and adjust a pulley or pulleys 5. The pulley or pulleys 5 are provided with optional mounting holes 30 and 31 for said placement. The tip portion of fishing rod butt section 1 has an attached rubber pad 6, an indentation 7 and a hole 8. Hole 8 is placed through the side diameter of said rod butt section to accommodate a pin 9 serving as an axle and placed through a centered hole 10 in a pair of rotating discs or spool 11. The spool 11 supports a plurality of holes 12 to be chosen from to place a spool rotation adjustment pin 13. Pin 13 is placed to adjust and set the limits of the spool's clockwise rotation by making contact with said rubber pad 6, thereby abruptly stopping and reversing the spool's clockwise rotation. Spool 11 also has an insular hole 14 to receive a second rotational control pin 15 to communicate with said indentation 7 to abruptly limit the counter-clockwise rotation of spool 11. Two final holes 16 have been placed through spool 11 for accommodating two fasteners 17 for attachment of a cylindrical appendage 18. The cylindrical appendage 18 is provided with two holes 19 for said attachment. Cylindrical appendage 18 also having a number of openings 20 placed along and through its side diameter and a narrow continuous slot 21 running through its top to bottom diameter. A pulley 5 is placed through said slot 21 then positioned at a chosen side opening 20 and attached there by means of a mounting pin 4 placed through center axis pulley hole 30. This mounting system allows pulley 5 a degree of longitudinal freedom along cylindrical appendage 18. The cylindrical appendage 18 and its adjustable pulley 5 is to communicate with flexible appendage 2 and its adjustable pulley or pulleys 5 by means of varying types of interchangeable O-ring style elastomers 22 or a cable 23. Slotted ring 28 and rubber connector 29 serve as links to adjust the union of cable 23 and pulley 5 of said cylindrical appendage 18. The cylindrical appendage 18 has an opening in its tip end to serve as a sleeve type ferrule 24, said ferrule is capable of accepting interchangeable fast, medium and slow fishing rod blanks, denoted by numerals 25, 26 and 27 respectfully. FIG. (2) is a plan view of the optional use of the cable energy storing system, referred to as mode (A). Placed on flexible appendage 2 at optional mounting holes 3 are two pulleys 5, each pulley has a hole 30 placed at their center axis and a second hole 31 located approximately at half the measurement radius to the pulleys out-ward most curving edge. Using said pulley hole 31, pulleys 5 are attached at optional mounting holes 3 by means of mounting pins 4. Pulleys 5 are of a double grooved variety where as a small pulley wheel is molded to a larger pulley wheel. Cable 23 is used in conjunction with said pulleys 5 and is threaded as follows; beginning at pulley hole 31 and looped around mounting pin 4 and protected by bushings 32, cable 23 runs at a slight downward angle to the base or bottom of the small wheel of a second pulley 5, here the cable enters a channel 33 and runs through the interior of the pulley then exits at the top of the larger wheel of said pulley 5. The cable 23, while controlled by the groove of said larger wheel, runs counter-clockwise along the wheel's circumference to fully run its perimeter. Cable 23 then runs on a level line to the larger wheel of first said pulley 5, here the cable runs counter-clockwise along the larger wheel's circumference to fully run its perimeter. Cable 23 then enters channel 33 at the top of said larger wheel. The cable then runs through the interior of first said pulley 5 and exits at the base or bottom of the small wheel of said pulley 5. Cable 23 then runs at a slight angle upward to pulley hole 31 of second said pulley 5, here the cable is looped around mounting pin 4 and protected by bushings 32 to complete said threading. Placed through slot 21 of the cylindrical appendage 18 and positioned at a coordinating side opening of said appendage, a third pulley 5 is mounted through its center axis hole 30 by means of mounting pin 4. This pulley supports a rubber connector 29. The connector is placed on either the large or small wheel of pulley 5 providing an option to its functional length. A slotted ring 28 is to receive cable 23 and rubber connector 29 thus completing the union of the cylindrical appendage 18 and its adjustable pulley with the flexible appendage 2 and the adjustable pulleys therein. This mode A cable system is used when casting projectiles of considerable weight such as those used when fishing in and around salt water. The system functions as follows; Upon the muscular impulse of a crisp backcast, the spool 11 rotates in a clockwise direction resulting in a pivoting motion of attached cylindrical appendage 18 and rod blank 25. As the cylindrical appendage 18 and its attached pulley 5 apply pressure to cable 23, the pulleys 5 of flexible appendage 2, are forced to rotate in a pivoting motion on their offset axis, as the small wheel of each pulley collects cable material the larger wheels are releasing material of cable 23, resulting in an approximate 270 degree flop or pivotal rotation of each of the two pulleys 5 of the said flexible appendage. This allows a reduction in the tension of cable 23, thus allowing an increase in the rotational speed of spool 11. The clockwise rotation of spool 11 is then abruptly stopped and reversed by means of a rotational adjustment pin 13 making contact with rubber pad 6. This abrupt stopping and reversing action combined with the abrupt releasing of energies stored in the said pivot pulley system, along with a pin 15 making contact with indentation 7 to abruptly arrest the spool's counter-clockwise rotation has induced an exaggeration in the effective bending length of the rod blank while adding time to the cast. This results in an increase in the rods recoil power and velocity. The mode A system is one of two energy storing modes the fisherman may choose from to increase the distance one may cast common fishing projectiles.

FIG. (3) is a plan view of the optional use of the interchangeable elastomer energy storing system, referred to as mode (B). In this mode, a simple union of the cylindrical appendage 18 with the flexible appendage 2 has been accomplished by mounting two pulleys 5. One pulley is to be mounted on each appendage through the use of mounting pins 4 and center axis pulley holes 30. On the cylindrical appendage 18, a pulley 5 is placed through slot 21 then positioned and mounted at a chosen side opening 20. On the flexible appendage 2, a pulley 5 is mounted at a selected mounting hole 3. An elastomer has been chosen from interchangeable elastomers 22 and placed at either sized wheels of said pulleys 5 or any combination of pulley wheel sizes or elastomers therein. A fishing rod blank is chosen from optional fast, medium or slow varieties, and placed in the ferrule tip 24 of said cylindrical appendage 18. The system functions as follows; upon the muscular impulse of a crisp backcast, the spool 11 rotates in a clockwise direction resulting in a pivoting motion of attached cylindrical appendage 18 and its accompanying rod blank. As the pulley supported elastomer 22 is storing its energy, the spool's clockwise rotation is abruptly stopped and reversed by means of a rotational adjustment pin 13 making contact with rubber pad 6. This abrupt stopping and reversing action combined with the releasing of energies contained in the pulley elastomer system, along with a pin 15 engaging with indentation 7 to abruptly arrest the spool's counter-clockwise rotation, has induced an exaggeration in the effective bending length of the rod blank while adding time to the cast. This results in an increase in the rods recoil power and velocity. In both the mode A and mode B energy storing systems, adjustments may be made in the angle and location of applied energy by means of said various mounting holes and openings along the length of the cylindrical and flexible appendages. Various other power altering adjustments are found in the various sized wheels of a pulley 5, the size and elasticity specifications of elastomer or elastomers 22, the adjustable clockwise rotation pin 13 of spool 11 and a choice of fast, medium or slow fishing rod blanks, denoted by numerals 25, 26 and 27 respectfully. The present invention effectively unites common fishing rod dynamics with the mechanics of this device to provide a substantially longer cast of common fishing projectiles. This is accomplished by its increased power and further advandaged by said options and adjustments to accommodate varying weights of commonly used fishing projectiles. It should be known, the scope of this invention is not limited to the fishing rod types of the accompanying drawings.

The materials holding preference in the manufacturing of this, a lightweight innovative fishing rod include plastics or aluminum for the spool and pulleys. The appendages would benefit by use of a fiberglass or graphite material as would the rod blanks and the rod butt section. A nylon or an equivalent material would suit the needs of the fasteners, pins and axle.

Having thus described this unique invention, what is claimed is:

1. A breakdown sport fishing rod which comprises: a fishing rod butt section, said rod butt section supporting a rotatable spool, said spool having separate means to abruptly limit its clockwise and counterclockwise rotation and means to support an elongated appendage, said elongated appendage being capable of receiving interchangeable fishing rod blanks at its free end, and having means to support a pulley which communicates by means of elastomers or energy storing cable with at least one other pulley located on a flexible appendage, said flexible appendage being supported by said rod butt section, whereby a muscular impulse of a crisp backcast induces a clockwise rotation of said spool resulting in a pivoting motion of said attached elongated appendage and its accompanying fishing rod blank and a storing of energy in said pulley support elastomers or cable, said spool's clockwise location being abruptly stopped and reversed by said clockwise rotation limiting means, which combined with the releasing of energy contained in the pulley supported elastomers or cable and the action of said counterclockwise rotation limiting means operates to induce an exaggeration in the effective bending length of the fishing rod blank which adds time to the cast, resulting in an increase in the rod's recoil power and velocity and provides a substantially longer cast.

2. The breakdown sport fishing rod of claim 1, wherein said flexible appendage pulley is adjustably attached to said flexible appendage and said elongated appendage pulley is adjustably secured to said elongated appendage such that the amount of energy stored in said pulley supported elastomers or cable when a backcast is made may be varied.

3. The breakdown sport fishing rod of claim 2, wherein said flexible appendage and said elongated appendage are each provided with a plurality of pulley mounting holes.

4. The breakdown sport fishing rod of claim 3, wherein said flexible appendage pulley has a centered axis hole and an offset axis hole to facilitate construction of an elastomer or cable energy storing system.

5. The breakdown sport fishing rod of claim 4, wherein said elongated appendage is cylindrical in shape and has a ferruled free end to receive interchangeable fishing rod blanks.

6. The breakdown sport fishing rod of claim 5, wherein said clockwise rotation limiting means is adjustable.

7. The breakdown sport fishing rod of claim 6, wherein two pulleys are adjustably secured to said flexible appendage and said flexible appendage pulleys communicate by means of elastomers or energy storing cable with each other and said elongated appendage pulley.

* * * * *